United States Patent [19]
Brumfield

[11] 3,747,769
[45] July 24, 1973

[54] COMPRESSIBLE DISPOSABLE FILTER PRESS FOR BLOOD

[76] Inventor: Robert C. Brumfield, 73 Emerald Bay, Laguna Beach, Calif.

[22] Filed: Aug. 2, 1971

[21] Appl. No.: 167,965

[52] U.S. Cl............................ 210/350, 210/DIG. 23
[51] Int. Cl............................................... B01d 33/00
[58] Field of Search.................... 210/350, 351, 352, 210/359, 238, 110, 19, 40, 356, 412, 416, 510, 508, 509, 81; 23/258.5

[56] References Cited
UNITED STATES PATENTS

| | | | |
|---|---|---|---|
| 2,586,226 | 2/1952 | Heldenbrand | 210/350 |
| 2,837,032 | 6/1958 | Horsting, Sr. | 210/356 X |
| 3,211,645 | 10/1965 | Ferrari | 210/81 X |
| 3,528,554 | 9/1970 | Ogden et al. | 210/352 X |
| 381,067 | 4/1888 | Grelle | 210/350 |
| 476,671 | 6/1892 | Moeller | 210/351 |
| 416,076 | 11/1889 | Rieck | 210/412 |

Primary Examiner—Samih N. Zaharna
Assistant Examiner—T. A. Granger
Attorney—J. L. Jones

[57] ABSTRACT

An open cell, compressed, elastic plastic foam filter medium, having average diameter cell pore openings selected values ranging from 25 to 150 microns, is disposed as a planar volume in a an adjustable disposable filter press. The filter medium is disposed between a pair of rigid filter press plates, which are in turn disposed in the filter press structure. The press can provide an adjustable control means suitable for varying the average diameter of the pore openings, by varying the compression of the filter medium. A flexible, filter press case provide means of assisting blood circulation through the filter medium, and of separating air entrained in the blood in the filter press.

5 Claims, 4 Drawing Figures

INVENTOR
ROBERT C. BRUMFIELD

AGENT 3,747,769

COMPRESSIBLE DISPOSABLE FILTER PRESS FOR BLOOD

BACKGROUND OF THE INVENTION

It is well known in medical practice that blood clots transported in the circulatory system of individuals can produce catastrophic medical problems, as the result of the clots lodging in capillary blood vessels of the brain, kidneys, and the like. It has become normal medical practice to attempt to remove emboli, such as surgical tissue debris, cell clumps, fibrin strands and denatured coagulated clumps of blood components from heart patients, patients who have had strokes, and from patients undergoing major surgical operating procedures.

Increasingly, extra coporeal blood circulation is being used in surgical procedures. It is now known that stored transfusion replacement blood tends to aggregate platelets and leucocytes, as the blood components become more adhesive on aging. The clumping particles become microemboli which should be removed from the circulating blood. Thus, there is a commercial requirement for an aseptic disposable filter means for removing all types of emboli from the circulatory system of patients undergoing medical treatment.

This invention teaches a disposable filter press for blood which can be manufactured under commercial conditions of clean room quality, and which can provide an aseptic medical product, pre-packaged and sealed for use as a single use disposable product. The product can be adapted to filter out blood emboli above 25 micron average diameter, or any larger selected average diameter. The filter press can also entrap on the entrance face of the filter medium any microsize air bubbles circulating in the blood stream, formed in the body perfusion process, or the like.

SUMMARY OF THE INVENTION

A pre-packaged, compressible, disposable filter press for blood has an elastic, reticulated polyurethane foam filter medium, or an equivalent open cell plastic foam and felt composition compatible with blood, disposed as a filter medium in a disposable filter press. The compressed foam composition may be reticulated or an open cell foam structure having foam cell connected pore openings ranging up to 100 openings per linear inch, or the like, of uncompressed foam. The compressible foam composition is suitably compressed between a pair of rigid filter plates to provide known controlled foam pore openings, diameters ranging in size down to 25 microns average. The foam physical structure is controlled to provide a range of pore diameter openings which safely allow the passage of hemoglobin and the like normal constituents of circulating blood in the body, yet which will filter out larger clotted particles of blood, micro air bubbles, and the like thrombi which can be transported in the circulatory system. Compressible means are provided for the filter medium composition, to adjust the foam pore opening sizes to the required value for a specific treatment. Likewise, pre-packaged filter medium of known pore opening sizes can be provided, ready for quick application of a filter press for a medical procedure. The adjustable filter press case can also provide a means for pumping blood through the filter medium in an emergency and separating air bubbles from the filtered blood prior to returning the filtered blood to the patient's circulatory system. The adjustable filter press case can comprise a pair of flexible diaphragms which can be manually squeezed to increase the ease of separating air. The adjustable filter press case can also comprise a manually adjustable bellows structure suitable in a catastrophic emergency for circulating blood through the filter medium. The external filter press structure can be transparent, providing simple observation means for determining the quality of separation of air from the filtered blood and the like.

The objects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT

Figure 1:
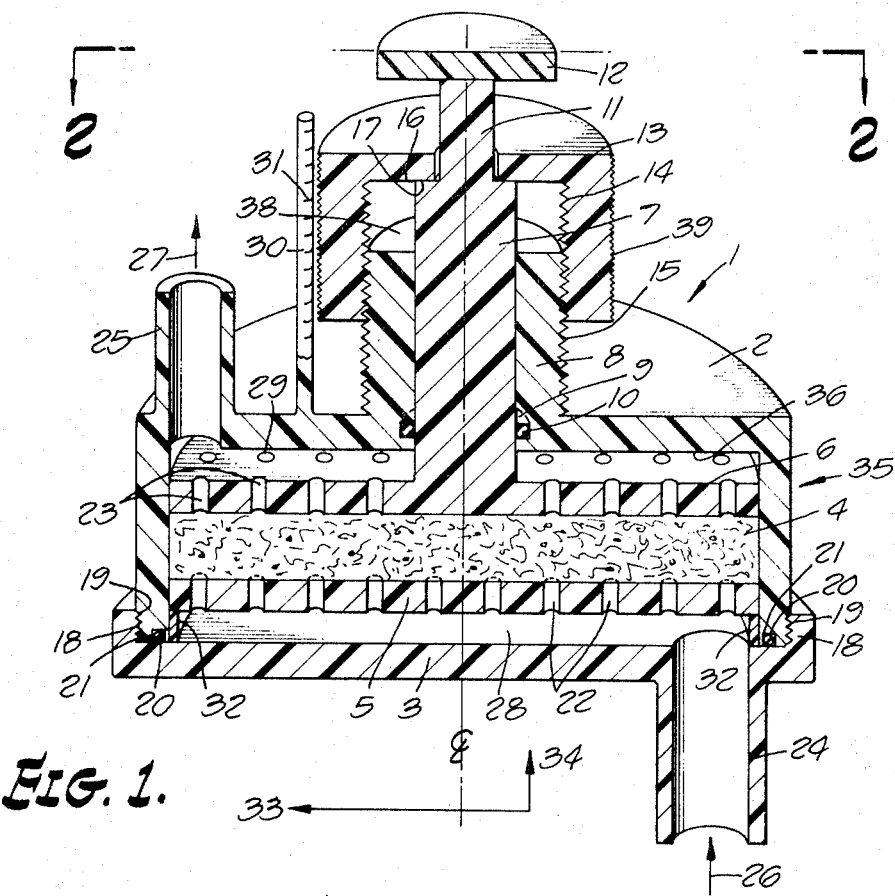
FIG. 1 is an elevational perspective sectional view of one disposable filter press for blood.

Referring to FIG. 1 in detail, the disposable, circular filter press 1 is shown in an elevational perspective sectional view, having a circular filter shell 2 hermetically sealed to a filter shell cover 3. The hermetic seal between 2 and 3 is secured by the O-ring groove 21 in which the O-ring 20 is disposed around the circular rim of the filter shell 2. The internal screw threads 18 are disposed in filter shell cover 3, mating with the external screw thread 19 on the rim of filter shell 2, securing the shell 2 and the cover 3 together. The filter shell 2 and the filter shell cover 3 in combination form a portion of filter press case 35 of the filter press 1. A pair of blood flow conductors consist of a flow inlet conduit 24 and a flow outlet conduit 25, each of these conduits being normally conductively secured to an opposed face of the case 35. The blood flow direction 26 being into conduit 24 and the blood flow direction 27 being out of the conduit 25. The pair of blood flow conduits 24 and 25 are integrally formed on and secured to opposed ends of a case diameter on the case 35.

An open cell, compressed, elastic plastic foam filter medium 4 is disposed as a planar volume inside the case 35, coplanar with the pair of case faces 36 of case 2, and 37 of case 3. The open cell compressed foam has pore openings adapted to selectively range in average diameter value from 25 to 50 microns. Typically, the compressed foam can be a reticulated polyurethane foam of the polyester type, a polyester fibrous felt, a silicone rubber foam, and a polypropylene fiber felt. Physically, the foam can have pore opening sizes ranging up to 100 pores per linear inch, or the like, in the uncompressed condition, containing up to 98 percent air. When compressed, the foam should form pore openings ranging in value from 25 to 150 microns, being adjustable to the required pore opening size as a systematic function of the compression ratio of the foam. It is absolutely necessary that the foam be chemically and physically compatible with the circulating blood. The foam composition should not leach chemicals into the circulating blood stream, nor should it produce a clotting effect on the blood components. The other components of the disposable filter press should likewise be chemically and physically compatible with the circulating blood, neither leaching into the bloodstream or producing blood clots.

Each one of a pair of opposed rigid filter press plates 5 are supportively disposed adjacent to one of the faces of the filter medium. The fixed filter plate 5 is coplanarly disposed adjacent to the case face 37, the plate 5 being held on the support ring 32. The adjustable filter plate 6 is likewise coplanarly disposed adjacent the case face 36. The ram plunger 7 is normally coaxially disposed on and permanently secured at a first plunger end to filter plate 6. In this apparatus the ram plunger 7 and the adjustable filter plate 6 are integral. A multiplicity of blood flow openings 22 are distributed through the thickness of filter plate 5 facilitating smooth, relatively non-turbulent blood flow through the supporting filter plate. An additional multiplicity of blood flow openings 23 penetrate through the filter plate 6, again allowing smooth, relatively non-turbulent flow through the filter plate after the blood flow has passed through the filter medium 4. Both the filter plates 5 and 6 are circular in planar dimension. The filter plate 5 is suitably dimensioned to fit tightly into the circular filter shell 2, being permanently seated on the support ring 32. The filter plate 5 can be permanently secured to the filter shell 2, preventing leakage of blood through openings between plate 5 and shell 2 which would allow blood to bypass the filter medium 4.

The ram plunger 7 is shown coaxially disposed in a plunger positioning cylinder 8, and 7 is closely slidably fitted in the cylinder 8. The cylinder axis of symmetry is disposed normal to the case shell 2 and one cylinder end is coaxially integrally secured to the exterior face of the shell 2. The cylinder 8 has screw threads 15 disposed on the exterior surface of cylinder 8, adjacent to the cylinder annular compression shoulder area 38. An annular seal means is shown to have a O-ring 10 coaxially disposed in an O-ring groove 9, slidably sealing the ram plunger 7 against blood flow between plunger 7 and cylinder 8. A compression collar 13 is shown to have internal screw threads 14 concentrically disposed inside the collar 13 which are adapted to engage the exterior screw threads 15 disposed on cylinder 8. An internal annular shoulder area 16 of collar 13 is a bearing surface mating with an annular shoulder area 17 of plunger 7, providing a bearing means for compressibly increasing the density of filter medium 4 by increasing the contact pressure between adjustable filter plate 6 and filter medium 4. In practice the concentric handle means 11 is integrally secured to the plunger 7, which is in turn secured to the knob 12. Manual force applied to the knob 12, thence through handle means 11 and rod plunger 7, compresses the filter medium 4 to a desired average diameter pore opening. When the filter medium 4 is compressed to the desired average diameter pore opening, the compression collar 13 is adjusted to this desired compression value position by mating or un-mating threads 14 and 15, as is necessary to mate the opposed annular shoulder areas 16 and 17. The compression ratio index rod 30 provides an indicia means for quickly identifying the average diameter pore opening of filter medium 4 disposed in filter press 1. By well known calibration means utilizing controlled pore opening sizes in the uncompressed filter medium, it is possible to establish indicia markings 31 on the collar 13 and the adjacent ratio index rod 30 together, which will enable medical personnel to quickly establish the controlled pore size opening of a disposable filter press 1, which may be necessary for a required medical procedure.

Figure 2:
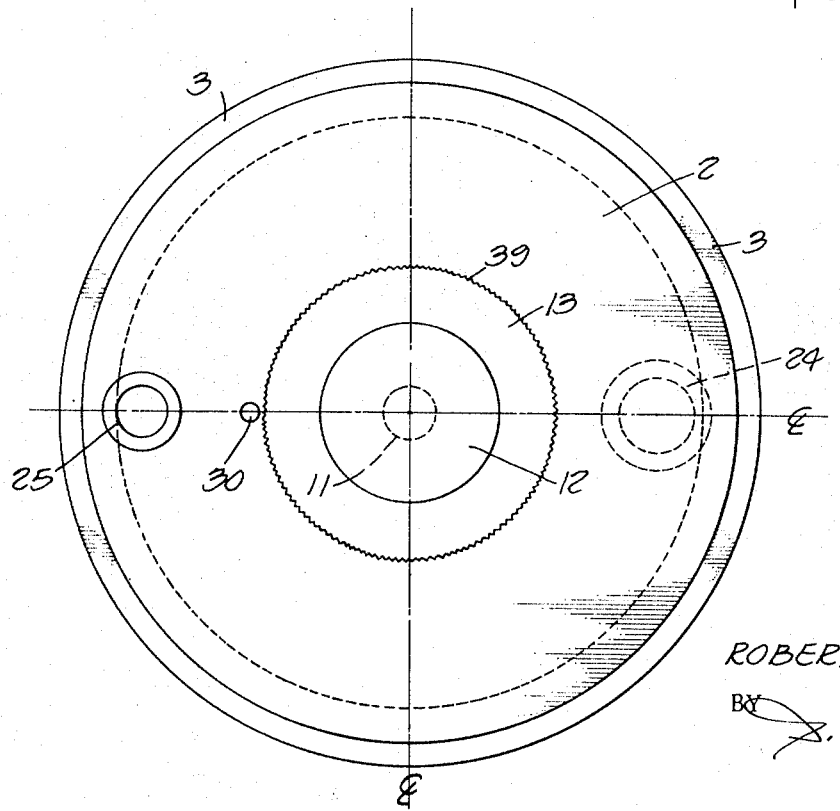
FIG. 2 is a plan view through 2—2 of FIG. 1.

FIG. 2 taken in conjunction with FIG. 1 illustrates the circular shape of the filter press 1. In plan view the filter shell 2 is shown to be coaxially secured to the filter shell cover 3. Knob 12 is shown coaxially disposed on a handle means 11, which in turn coaxially penetrates the compression collar 13. Knurling 39 is illustrated on the exterior of the collar 13, the knurling 39 easing and simplifying the manual vertical thread adjustment of the collar 13. The blood flow outlet conduit 25 is shown disposed uppermost on shell 2, and the blood inlet conduit 25 is shown disposed on the shell cover 3. On the upper side of the filter press 1 the compression ratio index rod 30 is shown vertically disposed on the shell 2 closely adjacent to the compression collar 13.

The compressible filter press case 35 comprises filter shell 2, shell cover 3, together with their securing means groove 21, O-ring 20 and mating screw threads 18 and 19, ram plunger 7, plunger positioning cylinder 8, annular seal means 9 and 10, compression collar 13, handle means 1, knob 12, and index rod 30. The above listed components together comprise a compressible press case 35 operatively adapted to quickly controlling filter medium average diameter pore opening size for the apparatus illustrated in FIGS. 1 and 2.

Figure 3:
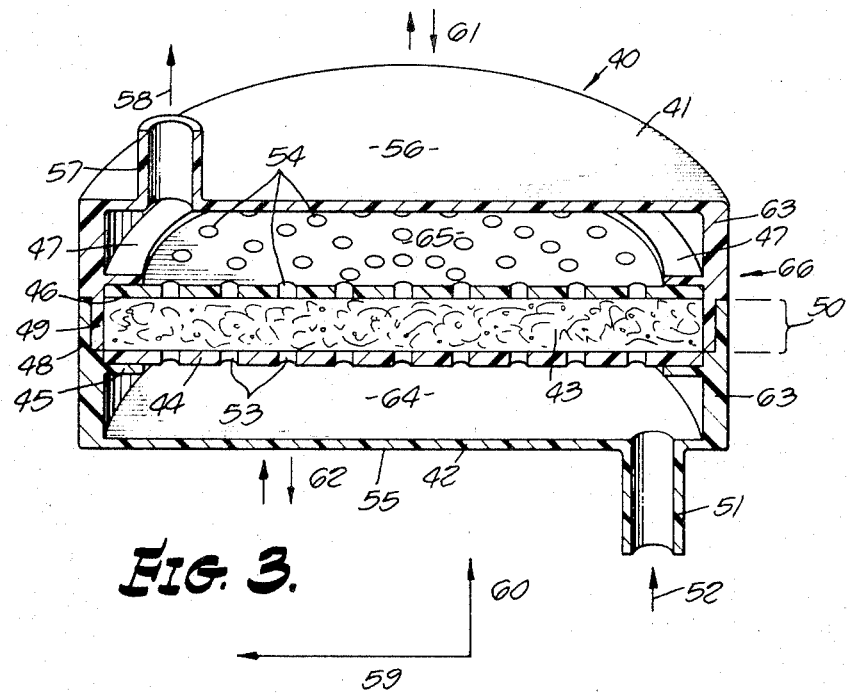
FIG. 3 is an elevational perspective sectional view of another disposable blood filter press of this invention.
Figure 4:
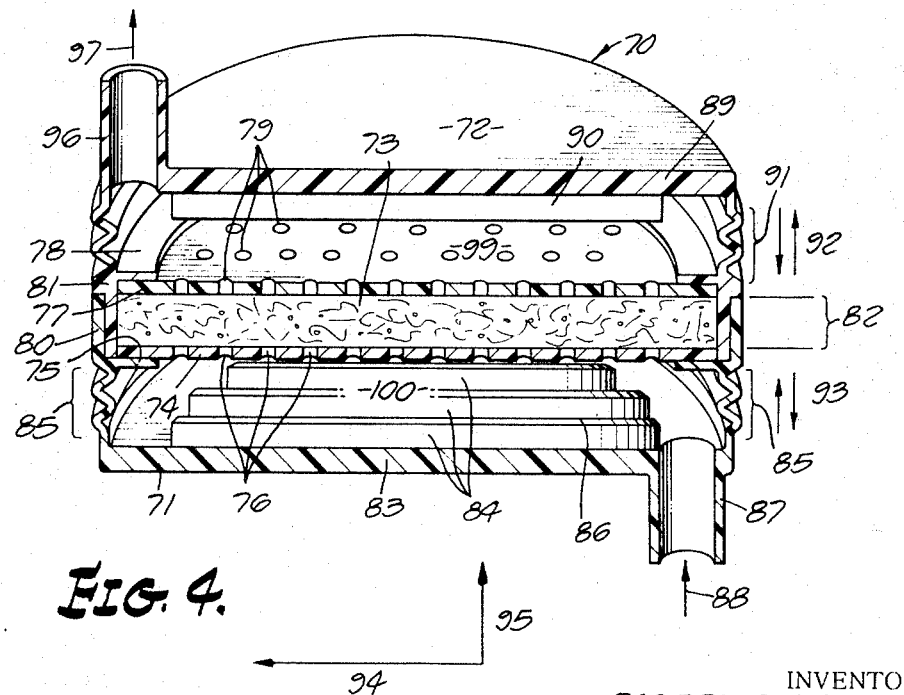
FIG. 4 is an elevational perspective sectional view of still another disposable blood filter press of this invention.

FIGS. 3 and 4 together illustrate two disposable filter press apparatus, both having flexible compressible filter press cases. In FIG. 3 the apparatus illustrates a flexible double diaphragm drum case. In FIG. 4 the apparatus illustrates integral accordion-fold flexible bellows pleats circularly disposed in the drum wall between the rigid diaphragm of a drum end and a confronting filter press plate.

Referring to each apparatus in detail, FIG. 3 illustrates a circular filter press 40 having an outlet filter press shell 41 and an inlet filter press shell 42. An elastic, reticulated plastic foam filter medium 43 is shown disposed in a fixed planar compressed volume between a fixed pair of rigid filter plates. The inlet filter plate 44 is shown disposed on an inlet plate support ring 45. The outlet filter plate 46 is shown disposed on an outlet plate support ring 47. The plate 44, support ring 45, plate 46 and support ring 47 are fixed in position inside the filter 40 providing a fixed average diameter pore opening value in the filter medium 43. The average diameter fixed pore opening values can be selected to range from 25 to 150 microns, and the like, by adjusting the compressed thickness 50 of the filter medium 43. A fluid conduit 51 is integral with the inlet filter press shell 42, and the blood flow direction is 52. The blood outlet conduit 57 is integral with the outlet filter press shell 41 and the blood outlet flow direction is 58. The conduits 52 and 57 are disposed on opposed ends of a press diameter, as is earlier illustrated in FIGS. 1 and 2. Shell 42 has an inlet securing lip 48, and shell 41 has an outlet securing lip 49, which are mating annular rings which can be tapered or straight wall to provide tight fits between the two lips 48 and 49. By suitably sizing the thickness 50, the mating lips 48 and 49 can provide constant and quick means of securing a desired compression ratio for a filter medium 43 inserted as the planar volume. Multiple, relatively large diameter apertures 53 penetrate uniformly through the filter plate 44, and multiple, relatively large diameter apertures 54 penetrate through filter plate 46 providing for uniform, low pressure drop, relatively non-turbulent flow of blood through the filter press 40. The circular shaped, thin wall diaphragms 55 and 56 of the shells respective 42 and 41 are flexible and provide a pumping mechanism for the filter press 40. As is illustrated in FIG. 3, the drum wall 63 is relatively thick and provides a rigid cylindrical drum wall. The flexible diaphragms 55 and 56 are relatively thin and are integral with the shells 42 and 41. The shells 41 and 42 together with the respective flexible shell diaphragms 56 and 55 and the pair of mating securing lips 49 and 48 respectively comprise the flexible filter press case 66. In commercial use the securing lips 48 and 49 are integrally bonded together by well known bonding processes.

As a first use step for filter 40, initiate blood or blood replacement flow throught the inlet conduit 51 in the direction of flow 52 and then out through outlet conduit 57 in the blood flow direction 58. Then begin periodically substantially decreasing and increasing the volume of the blood reservoir apertures 64 and 65, by rythmically compressing and expanding diaphragms 55 and 56, in the drections 62 and 63 respectively, forcing circulating blood fluid through the filter medium 43. By rotating the filter press 40 from the horizontal axis 59 to a new horizontal axis 60, as is necessary, it is possible to displace entrapped blood from filter medium 43 and from reservoir 64. To aid in the medical observations, judgment and skill necessary to safely filter the patient's blood, it is desirable to make the filter press shell structure of transparent or translucent plastic.

FIG. 4 illustrates in detail the bellows filter press 70 having an inlet press shell 71 and an outlet press shell 72. The reticulated foam filter medium 73 is disposed, as in the apparatus of FIG. 3, in a fixed planar compressed volume on the rigid inlet filter plate 74 supported on the inlet plate support ring 75, having inlet plate multiple flow apertures 76. The rigid outlet support plate 77 has an outlet support ring 78 and the plate has multiple relatively large diameter flow apertures 79. The inlet shell 71 has the circular inlet shell securing lip 80 and the outlet shell 72 has the outlet securing lip 81. The lips 80 and 81 are adaptively disposed to tightly fit together for hermetic sealing, as will be later discussed. The thickness 82 of the compressed filter medium 73 is provided by accurately pre-determining the dimensions of shell lips 80 and 81. The thick wall drum diaphgram 83 of shell 71 is in contrast to the thin wall diaphragm 55 of shell 42, and the thick wall drum diaphragm 89 of shell 72 in contrast to the thin wall drum diaphragm 56 of shell 41. The thick wall diagpragm 83 has disposed on its inner surface multiple reinforcing ribs 84 designed to stiffen the diaphragm 83. Also thick reinforcing ribs 90 are shown disposed on the interior of diaphragm 89. Two, thin wall, integral accordion-fold, flexible bellow pleats 85 are shown circularly disposed in the drum wall of press shell 71. Similarly, two, thin wall, integral accordionfold, flexible bellow pleats 91 are also shown circularly disposed in the drum wall of press shell 72. Each of the sets of pleats 85 and 91 completely encircle their respective drum walls. The pleats 85 can be manually oscillated in the arrow directions 93, and the pleats 91 can be likewise manually oscillated in the arrow directions 92. The blood inlet conduit 87 is shown disposed on a diameter of the circular filter press 70 at one end of the diameter, and the blood outlet conduit 96 is shown disposed at the opposed end of the same press diameter. As in filter press case 66, the compressible filter case 98 comprises shells 71 and 72, having thick diaphragm walls 83 and 89, together with bellows pleats 85 and 91, and mating lips 80 and 81.

In medical procedural treatment, the blood flow direction 88 into inlet conduit 87 is followed by blood flow through the outlet conduit 96 in the direction 97. The circulating blood perfuses the filter medium 73, filling the blood reservoir apertures 100 and 99. As for filter press 40, by periodically substantially decreasing and increasing the volumes of the pair of blood reservoir apertures 100 and 99, through periodic manually compressing and expanding the accordion pleats 85 and 91 in the directions 92 and 93, the air entrained or entrapped in the filter press 70 can be eliminated. In addition, by rotating the filter press 70 from the vertical axis 95 to the vertical axis 94 by 90°, it is possible to assist the separation of air bubbles from the filtered blood.

It is absolutely necessary, for the patient's safety, that the filter press apparatus of this invention be chemically and physically compatible with circulating blood. Consistent with the requirements for flexibility of the compressible filter press case, and the rigidity of other required components in the filter press structure, the mechanical structure of the filter press can be rigid and flexible polyvinyl chloride as is required, high density polyethylene, polypropylene, flexible and rigid polyurethane, flexible and rigid silicone and polycarbonate, as are required. The above listed chemical compositions have been determined to be compatible with circulating blood. The open cell, compressible, elastic plastic foam filter medium can be selected from polyurethane foam of the open cell reticulated modification, polyester felts, silicone rubber foam of the open cell type, and polypropylene fiber foam of the open cell construction. Typically, these foams can contain in the expanded state, prior to compression, up to 100 pores per linear inch of foam, or the like, containing up to 98 percent air volume. Since red corpuscles are typically ranging to 8–10 microns in diameter and white corpuscles range to 20 microns diameter, the filter medium when compressed should form open cell structure typically ranging from 25 to 150 microns.

In general, a typical circular filter press apparatus can range from 4 to 6 inches in diameter, having a flow rate of 0.5 to 7.5 liters per minute. Prior to inducting the patient's circulating blood, the filter press can be primed with saline solution, blood plasma, or other blood, as is necessary. The filter press can be used with other apparatus, in assisting the treatment of a patient's circulatory system.

The compressible filter press of this invention is particularly adapted to filtering out micro and macro emboli in the circulating blood and transfusion blood replacement, but the press also adapted to filtering out micro air emboli which can be formed in the circulating blood during perfusion and the like. The compressible filter press can be operatively compressed and expanded as described above, to remove entrapped air prior to placing the press containing patient blood replacement in the patient's extra coporeal circulation system. By utilizing a pair of compressible filter presses disposed in parallel in the patient's extracoporeal circulatory system, one of the parallel filter presses can be used to trap all emboli. When sufficient emboli are trapped to produce a significant increase in pressure drop across the first filter, the first filter can be clamped off. Concurrently, the second parallel filter press is then placed in filter operation. Thus blood component emboli, as well as air emboli, can be removed from the circulatory system.

Hermetic sealing of the external case means is necessary for all the apparatus illustrated. The apparatus of FIGS. 1 and 2 is externally sealed by O-ring means, preventing the egress of circulating blood, and the ingress of infectious bacteria, and the like. In each of the filter presses of FIG. 3 and of FIG. 4, the pair of case means, the pair of filter plates, the pair of filter plate support ring means, and the elastic filter medium are integrally bonded at their contiguous perimeter areas, to form hermetic seals. The bonding can be accomplished by well known cementing procedures, ultrasonic sealing, dielectric sealing, or conductive heat sealing, as are applicable and necessary. In conformance with well known principles, the plastic chemical compositions selected for sealing together must be chemically and physically compatible. It is desirable that the selected filter press components be chemically and physically stable under standard medical steam sterilization conditions, or other medically acceptable sterilization conditions.

Typically component group of a filter press, such as press shell 41 and outlet conduit 57 are integrally molded in the selected plastic, as are press shell 42 and inlet conduit 51. Overhangs should be avoided in molded plastic component groups to avoid excessive plastic injection mold costs.

Many modifications and variations of the improvement in disposable blood filter presses may be made in the light of my teaching. It is therefore understood that within the scope of the appended claims, the invention may be precticed otherwise than as specifically described.

I claim:

1. In a disposable filter press suitable for filtering blood, the improvement comprising in combination:
   an exterior filter press case,
   a pair of blood flow conduits, consisting of a flow inlet conduit and a flow outlet conduit, each said conduit secured to an opposed face of said case at opposed ends of a diameter of said case,
   an open cell, compressed elastic plastic foam filter medium, said filter medium having pore openings adapted to selectively range in average diameter value from 25 to 150 microns, said filter medium disposed as a planar volume inside said case means coplanar with the pair of case faces,
   means providing a variable compression ratio range for said filter medium,
   a pair of blood reservoir apertures, each one of said pair of reservoir apertures oppositely coplanarly disposed inside said case means adjacent one face of said filter medium and conductively connected to one of said pair of blood flow conducts,
   whereby blood can be circulated through said inlet conduit secured on said case, through one said blood reservoir aperture, thence through said filter medium, thence through a second said blood reservoir aperture, and out through said outlet conduit.

2. A disposable filter press suitable for filtering circulating blood, comprising in combination:
   an exterior filter press case, having means providing a regulated variable compression ratio range for said filter press case,
   a pair of blood flow conduits, consisting of a flow inlet conduit and a flow outlet conduit, each said conduit secured to an opposed face of said case at opposed ends of a diameter of said case,
   an open cell, compressed, elastic plastic foam filter medium, said filter medium having pore openings adapted to selectively range in average diameter value from 25 to 150 microns, said filter medium disposed as a planar volume inside said case coplanar with the pair of case faces,
   a pair of opposed filter press plates for said foam filter medium, each one of said plates supportively disposed adjacent one face of said filter medium, said press plates coplanarly adapted and secured inside said case means to provide passage of all blood flow only through said filter medium and said pair of plates, and
   a pair of blood reservoir apertures, each one of said pair of reservoir apertures oppositely coplanarly disposed inside said case adjacent one said press plate, and conductively connected to one of said pair of blood flow conduits,
   whereby blood can be circulated through said inlet conduit, through one said blood reservoir aperture, thence through said filter medium, disposed between said pair of filter press plates, thence through a second said blood reservoir aperture, and out through said outlet conduit.

3. In an apparatus as set forth in claim 2 wherein said filter press case means providing a regulated compression ratio range comprises a flexible diaphragm drum case having a pair of opposed flexible diaphragms.

4. In an apparatus as set forth in claim 2 wherein said filter press case means providing a regulated compression ratio range comprises a rigid double diaphragm drum, having at least one integral accordion-fold, flexible bellows pleat circularly disposed in the drum wall between each rigid diaphragm and the confronting filter press plate.

5. A disposable filter press suitable for filtering circulating blood, comprising in combination:
   an exterior filter press case,
   a pair of blood flow conduits, consisting of a flow inlet conduit and a flow outlet conduit, each said conduit secured to an opposed face of said case at opposed ends of a diameter of said case,
   an open cell, compressed, elastic plastic foam filter medium, said filter medium having pore openings adapted to selectively range in average diameter value from 25 to 150 microns, said filter medium disposed as a planar volume inside said case coplanar with the pair of case faces,
   a pair of opposed filter press plates for said foam filter medium, each one of said plates supportively disposed adjacent one face of said filter medium, said press plates coplanarly adapted and secured inside said case means to provide passage of all blood flow only through said filter medium and said pair of plates, and
   a pair of blood reservoir apertures, each one of said pair of reservoir apertures oppositely coplanarly disposed inside said case adjacent one said press plate, and conductively connected to one of said pair of blood flow conduits, a ram plunger, normally coaxially disposed on and permanently secured at a first plunger end to one of said pair of filter press plates, said plunger having an annular compression shoulder area disposed on the plunger free second end, a plunger positioning cylinder, said cylinder concentrically closely slidably fitting around said plunger, the cylinder axis of symmetry disposed normal to a case first face and a first cylinder end coaxially integrally secured to said first face, said cylinder having screw threads disposed in the exterior surface thereof adjacent to the cylinder free second end, aforesaid cylinder second end having an annular compression shoulder area disposed thereon, an annular seal means disposed between said plunger and said plunger positioning cylinder, preventing blood flow therebetween, a compression collar means, having an internal compression shoulder area concentrically disposed therein, said collar means having interior screw threads adaptively engaging said exterior screw threads on said cylinder, said internal shoulder area compressively engaging said plunger annular shoulder area, a compression index measuring means, disposed on the case exterior, said means indicating the pore opening average diameter of said filter medium, as said compression collar means adaptively engages said threads on said cylinder, compressing said filter medium, and a handle means secured to said plunger, cooperatively adapted to compressively position said plunger prior to securing the plunger position with said compression collar means, whereby said filter medium can be adapted to the selected pore opening average diameter required to filter said circulating blood and said filter medium can be periodically compressed and expanded to remove entrapped air.

* * * * *